US012335712B2

(12) United States Patent
Yang et al.

(10) Patent No.: US 12,335,712 B2
(45) **Date of Patent: *Jun. 17, 2025**

(54) SPEAKER

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignees: AAC Microtech (Changzhou) Co., Ltd., Changzhou (CN); AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 221 days.

This patent is subject to a terminal disclaimer.

(21) Appl. No.: 17/981,495

(22) Filed: Nov. 7, 2022

(65) Prior Publication Data

US 2023/0328451 A1 Oct. 12, 2023

(30) Foreign Application Priority Data

Apr. 6, 2022 (CN) ......................... 202220782431.8

(51) Int. Cl.
*H04R 3/00* (2006.01)
*H04R 1/06* (2006.01)
(Continued)

(52) U.S. Cl.
CPC ................. *H04R 9/06* (2013.01); *H04R 1/06* (2013.01); *H04R 3/00* (2013.01); *H04R 7/127* (2013.01);
(Continued)

(58) Field of Classification Search
CPC ... H04R 9/06; H04R 1/06; H04R 3/00; H04R 7/127; H04R 7/18; H04R 9/025; H04R 9/046; H04R 2400/11
(Continued)

(56) References Cited

U.S. PATENT DOCUMENTS 7,840,025 B2 * 11/2010 Ikeda ....................... H04R 9/04 381/403
8,794,374 B2 * 8/2014 Kim ......................... H04R 7/16 181/171
(Continued)

*Primary Examiner* — William J Deane, Jr.
(74) *Attorney, Agent, or Firm* — Wiersch Law Group

(57) ABSTRACT

A speaker includes a diaphragm, a voice coil with a lead wire, and a flexible circuit board assembly. The flexible circuit board assembly includes at least two flexible circuit boards and a soldering sheet. Each flexible circuit board includes an inner fixing portion including an upper surface close to the diaphragm, the upper surface of a first flexible circuit board is provided with a first pad, the upper surface of a second flexible circuit board is provided with a second pad. The lead wire is arranged on a side of the first flexible circuit board close to the diaphragm and is electrically connected to the first pad. The soldering sheet includes a first fixing portion electrically connected to the second pad, a second fixing portion and a third fixing portion electrically connected to a bottom surface of the voice coil. The speaker has a better acoustic performance.

7 Claims, 4 Drawing Sheets

(51) Int. Cl.

| | |
|---|---|
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............... *H04R 7/18* (2013.01); *H04R 9/025* (2013.01); *H04R 9/046* (2013.01); *H04R 2400/11* (2013.01)

(58) Field of Classification Search
USPC ......................... 381/117, 116, 142, 401, 412
See application file for complete search history.

(56) References Cited

U.S. PATENT DOCUMENTS

| | | | | |
|---|---|---|---|---|
| 10,277,986 | B2 * | 4/2019 | Li | H04R 7/12 |
| 2015/0222995 | A1 * | 8/2015 | Hori | H04R 9/025<br>381/412 |
| 2018/0027336 | A1 * | 1/2018 | Li | H04R 9/025<br>381/398 |
| 2019/0028804 | A1 * | 1/2019 | Zhao | H05K 7/1427 |
| 2020/0045433 | A1 * | 2/2020 | Hu | H04R 9/025 |
| 2020/0045459 | A1 * | 2/2020 | Hu | H05K 1/028 |
| 2020/0045471 | A1 * | 2/2020 | Song | H04R 9/06 |
| 2020/0204921 | A1 * | 6/2020 | Gu | H04R 9/06 |
| 2020/0213761 | A1 * | 7/2020 | Xiao | H04R 7/04 |

* cited by examiner

SPEAKER

TECHNICAL FIELD

The present disclosure relates to an electro-acoustic device, in particular to a speaker used in portable electronic products.

BACKGROUND

A related speaker mainly includes a frame, a vibration system fixed to the frame, and a magnetic circuit system with a magnetic gap for driving the vibration system to vibrate and emit sounds.

The vibration system includes a diaphragm fixed to the frame, a voice coil located in the magnetic gap and driving the diaphragm to vibrate and emit sounds, and a flexible circuit board fixed to the frame and electrically connected to the voice coil. Pads on the flexible circuit board all face the diaphragm, the voice coil includes a first lead wire and a second lead wire, which are respectively the incoming and outgoing wires of the voice coil. The first lead wire and the second lead wire are respectively located at two opposite sides of the flexible circuit board. Therefore, the first lead wire is directly electrically connected to one pad on the flexible circuit board, and the second lead wire has to turn over and pass through a gap between the voice coil and the flexible circuit board, and then connect with another pad.

The consistency of the gap between the voice coil and the flexible circuit board of the speaker with this structure cannot be controlled, and the voice coil will push the pads outward, resulting in a risk of the separation of the voice coil and the flexible circuit board. In addition, an extra space for the voice coil lead wire to tune over is needed, which will occupy the internal space of the speaker and affect the acoustic performance of the speaker, Therefore, it is a need to provide an improved speaker to solve the above problems.

SUMMARY

In view of the above, an objective of the present disclosure is to provide a speaker with better acoustic performance.

In order to achieve the objective mentioned above, the present disclosure discloses a speaker including: a frame, a vibration system fixed to the frame, including a diaphragm fixed to the frame, a voice coil with a lead wire, and a flexible circuit board assembly fixed to the frame and electrically connected with the voice coil, a magnetic circuit system for driving the vibration system to vibrate and emit sounds, fixed to the frame and including a magnetic gap, wherein the flexible circuit board assembly includes at least two flexible circuit boards and a soldering sheet, the at least two flexible circuit boards include a first flexible circuit board and a second flexible circuit board, each flexible circuit board includes an outer fixing portion fixedly connected with the frame, an inner fixing portion spaced from the outer fixing portion, and an elastic connecting arm connecting the outer fixing portion and the inner fixing portion; each inner fixing portion includes an upper surface close to the diaphragm, the lead wire is arranged on a side of the first flexible circuit board close to the diaphragm, the upper surface of the first flexible circuit board is provided with a first pad, the upper surface of the second flexible circuit board is provided with a second pad, the lead wire is electrically connected to the first pad; the soldering sheet electrically connects the voice coil and the second flexible circuit board and includes a first fixing portion electrically connected to the second pad, a second fixing portion bent and extending from the first fixing portion to a direction away from the diaphragm, and a third fixing portion bent and extending from an end of the second fixing portion away from the first fixing portion to the voice coil, the third fixing portion is electrically connected to a bottom surface of the voice coil.

As an improvement, the at least two flexible circuit boards further include a third flexible circuit board and a fourth flexible circuit board, the first flexible circuit board, the second flexible circuit board, the third flexible circuit board, and the fourth flexible circuit board are respectively arranged at four corners of the frame.

As an improvement, the first fixing portion of the soldering sheet and the second pad are fixedly connected by soldering.

As an improvement, the second fixing portion of the soldering sheet abuts against a side surface of the voice coil.

As an improvement, a width of the third fixing portion of the soldering sheet is the same as that of the bottom surface of the voice coil.

As an improvement, the magnetic circuit system includes a yoke, and a main magnet and a plurality of secondary magnets located on the yoke, the plurality of secondary magnets is located around the main magnet and forms the magnetic gap with the main magnet, a plurality of receiving spaces for receiving the at least two flexible circuit boards is formed between adjacent secondary magnets.

As an improvement, the magnetic circuit system further includes a main pole plate located on the main magnet and a secondary pole plate located on the plurality of secondary magnets, the secondary pole plate is provided with a plurality of avoiding spaces respectively corresponding to the plurality of receiving spaces, and a projection of the flexible circuit board assembly along the vibration direction of the diaphragm is at least partially located in a corresponding one of the avoiding spaces.

As an improvement, the frame includes a plurality of receiving grooves for accommodating the outer fixing portions of the at least two flexible circuit boards, and each outer fixing portion is fixed in a corresponding one of the receiving grooves.

DESCRIPTION OF EMBODIMENTS

The technical solutions in embodiments of the present disclosure will be described clearly and completely below with reference to the accompanying drawings in the embodiments of the present disclosure.

Figure 1:
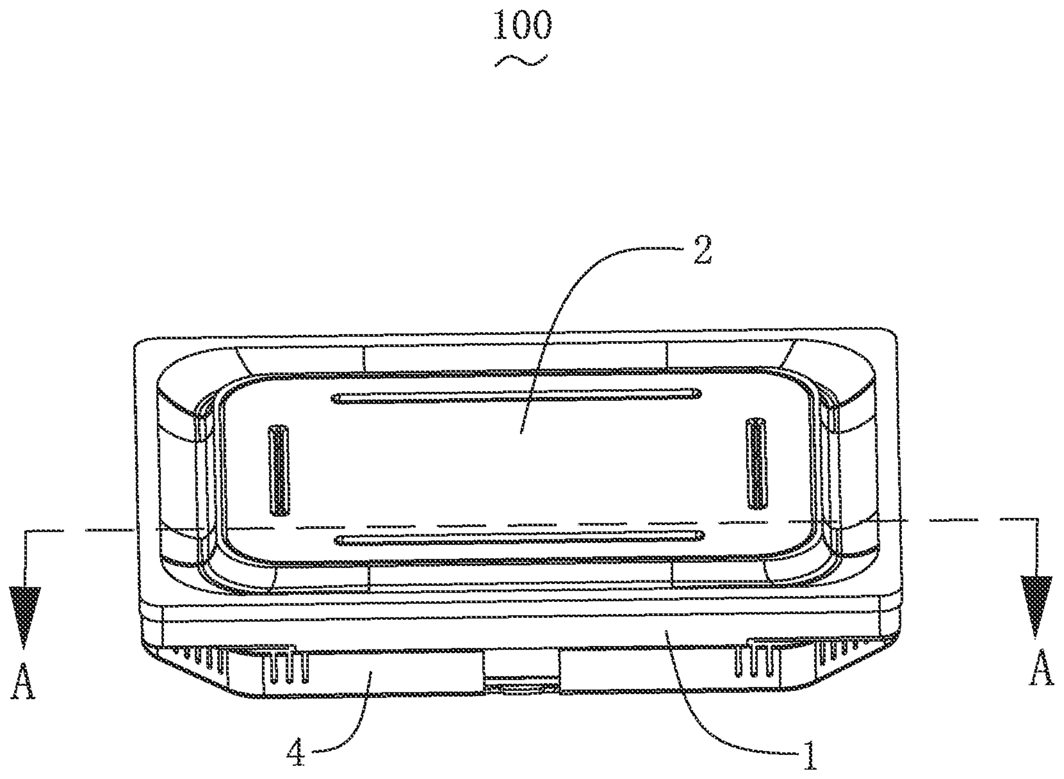
FIG. 1 is an isometric view of a speaker in accordance with an exemplary embodiment of the present disclosure.
Figure 2:
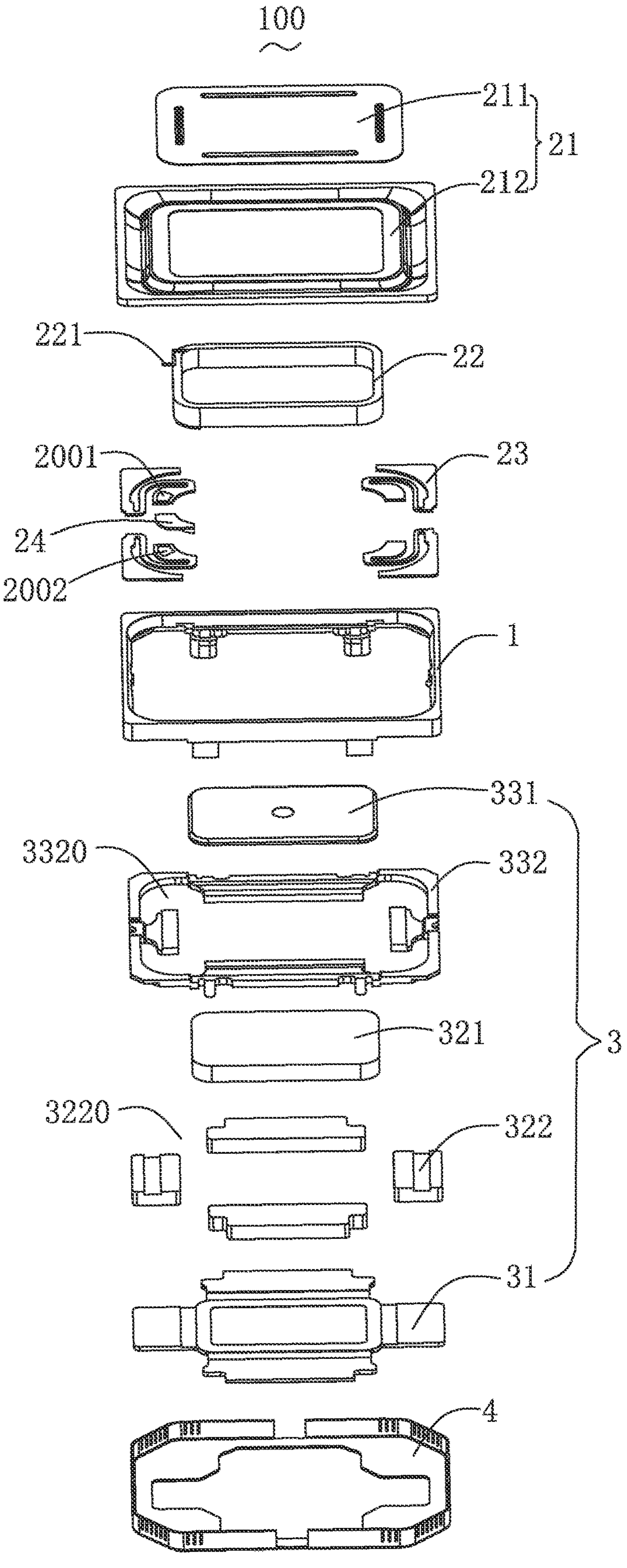
FIG. 2 is an exploded view of the speaker in FIG. 1.
Figure 3:
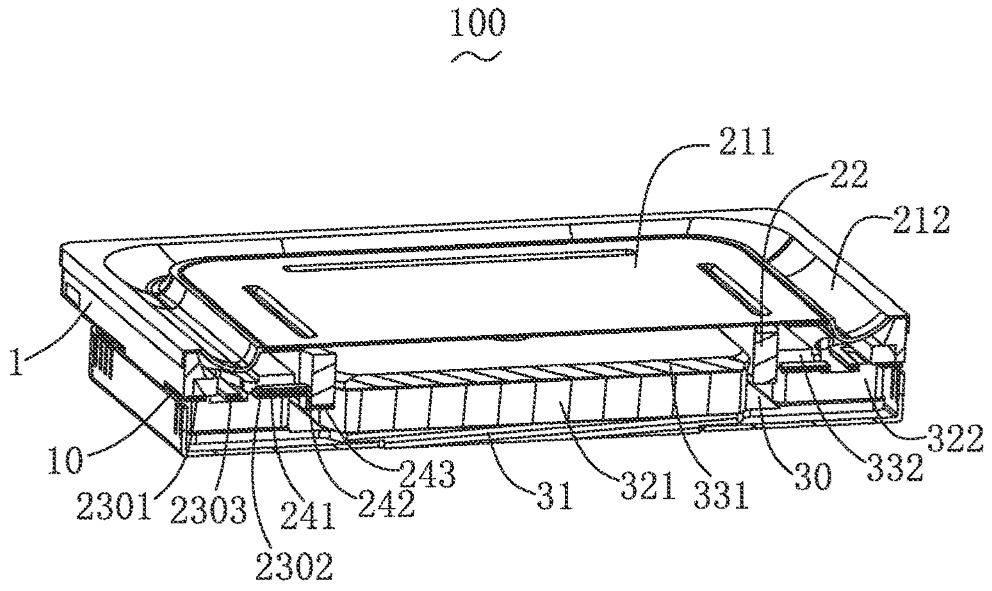
FIG. 3 is a cross-sectional view of the speaker taken along line A-A in FIG. 1.
Figure 4:
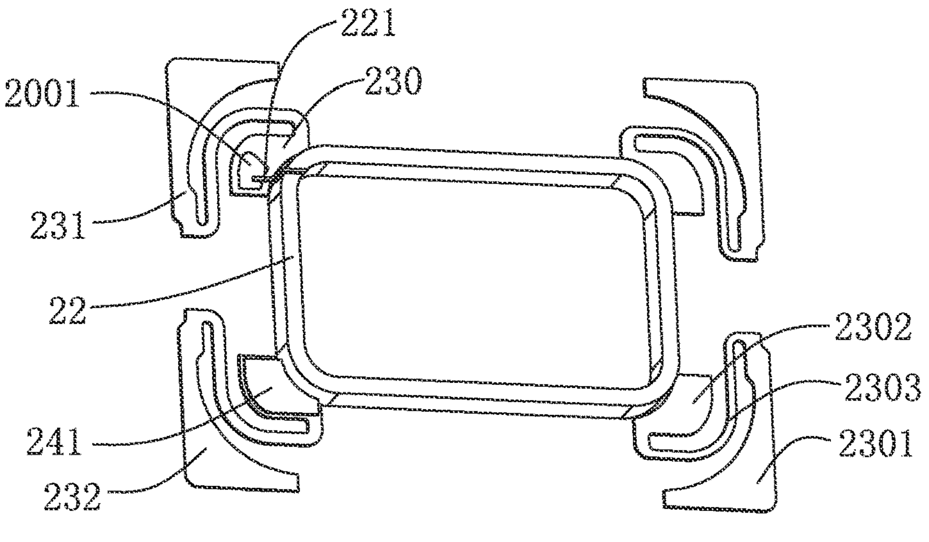
FIG. 4 is an illustrative assembled view of a voice coil and a flexible circuit board.
Figure 5:
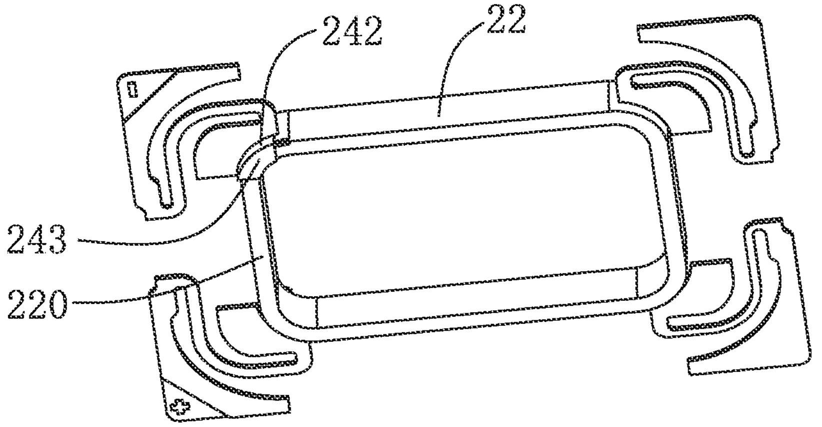
FIG. 5 is an illustrative assembled view from another angle in FIG. 4.
Figure 6:
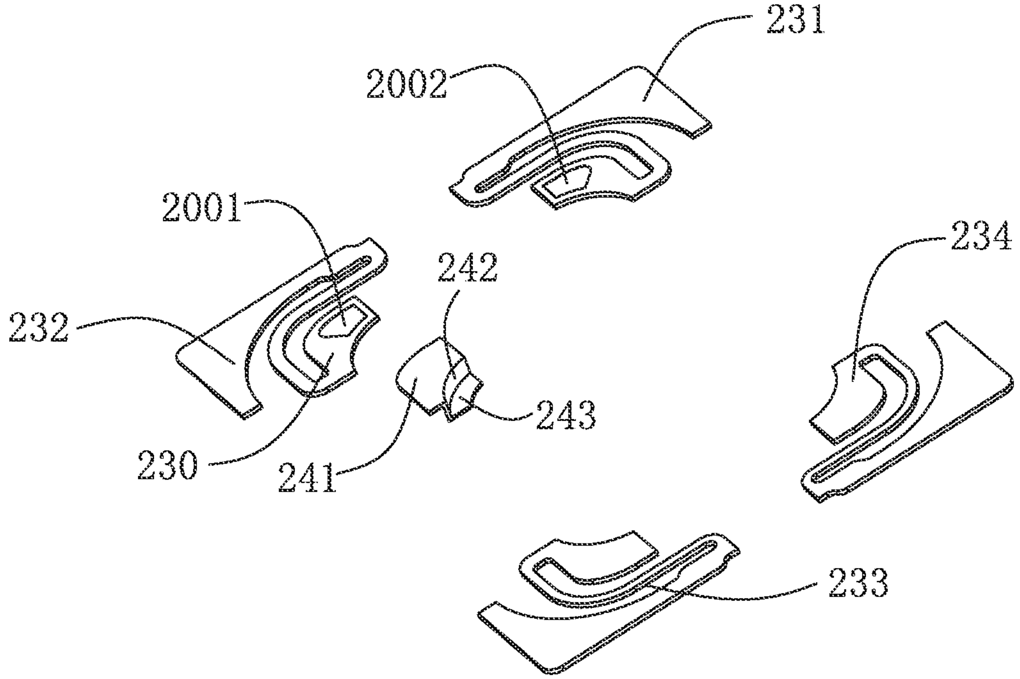
FIG. 6 is an isometric view of the flexible circuit board in the speaker in accordance with an exemplary embodiment of the present disclosure.

As shown in FIGS. 1-6, the present disclosure discloses a speaker 100. The speaker 100 includes a frame 1, a vibration system 2 fixed to the frame 1, and a magnetic circuit system 3 for driving the vibration system 2 to vibrate and emit sounds, the magnetic circuit system 3 includes a magnetic gap 30.

The vibration system 1 includes a diaphragm 21 fixed to the frame 1, a voice coil 22 located in the magnetic gap 30 and driving the diaphragm 21 to vibrate and emit sound, and a flexible circuit board assembly 23 fixed to the frame 1. The flexible circuit board assembly 23 is electrically connected with the voice coil 22.

Optionally, the diaphragm 21 further includes a dome 211 in a center thereof and a suspension 212 connected with the dome 211.

The voice coil 22 includes a lead wire 221 located at a side of the flexible circuit board assembly 23 close to the diaphragm 21.

The flexible circuit board assembly 23 includes at least two flexible circuit boards, the at least two flexible circuit boards includes a first flexible circuit board 231 and a second flexible circuit board 232, each flexible circuit board includes an outer fixing portion 2301 fixedly connected with the frame 1, an inner fixing portion 2302 spaced from the outer fixing portion 2301, and an elastic connecting arm 2303 connecting the outer fixing portion 2301 and the inner fixing portion 2302. Each inner fixing portion 2302 includes an upper surface 230 close to the diaphragm 21, the lead wire 221 is arranged on a side of the first flexible circuit board 231 close to the diaphragm 21. The upper surface 230 of the first flexible circuit board 231 is provided with a first pad 2001, the lead wire 221 is electrically connected to the first pad 2001. Optionally, the lead wire 221 and the first pad 2001 are fixedly connected by soldering.

The flexible circuit board assembly 23 further includes a soldering sheet 24, the soldering sheet 24 electrically connects the voice coil 22 and the second flexible circuit board 232. The upper surface 230 of the second flexible circuit board 232 is provided with a second pad 2002. The soldering sheet 24 includes a first fixing portion 241 electrically connected to the second pad 2002, a second fixing portion 242 bent and extending from the first fixing portion 241 to a direction away from the diaphragm 21, and a third fixing portion 243 bent and extending from an end of the second fixing portion 242 away from the first fixing portion 241 to the voice coil 22, the third fixing portion 243 is electrically connected to a bottom surface of the voice coil 22. Optionally, if the lead wire 2221 is an incoming wire of the voice coil 22, the bottom surface 220 of the voice coil is an outgoing wire of the voice coil 22; if the lead wire 2221 is an outgoing wire of the voice coil 22, the bottom surface 220 of the voice coil 22 is an incoming wire of the voice coil 22. Therefore, the voice coil lead wire 2221 can be directly electrically connected to the flexible circuit board assembly 23, thereby avoiding the voice coil lead wire turning over, improving the consistency of the relative positions of the voice coil 22 and the flexible circuit board assembly 23, saving the space for the voice coil lead wire to turn over, and improving the acoustic performance of the product.

Optionally, the first fixing portion 241 of the solder sheet 25 and the second solder pad 2002 are fixedly connected by soldering, so as to realize the electrical conduction between the solder sheet 25 and the second solder pad 2002; the second fixing portion 242 abuts against a side surface of the voice coil 22, so as to support and fix the voice coil 22; the third fixing part 243 is also fixedly connected with the bottom surface 220 of the voice coil 22 by soldering, and the third fixing portion 243 can also support and fix the voice coil 22. In addition, the width of the third fixing portion 243 is the same as that of the bottom surface 220 of the voice coil 22, which can maximize the soldering and fixing functions.

In addition, the at least two flexible circuit boards further includes a third flexible circuit board 233 and a fourth flexible circuit board 234, the first flexible circuit board 231, the second flexible circuit board 232, the third flexible circuit board 233, and the fourth flexible circuit board 234 are respectively arranged at four corners of the frame 1.

Optionally, the magnetic circuit system 3 includes a yoke 31, a main magnet 321 and a plurality of secondary magnets 322 located on the yoke 31, a main pole plate 331 located on the main magnet 321 and a secondary pole plate 332 located on the plurality of secondary magnets 322. The secondary magnet 322 is located around the main magnet 321 and forms the magnetic gap 30 with the main magnet 321, an amount of the secondary magnets 322 is four, and the four secondary magnets 322 are arranged around the main magnet 321, each two of the four secondary magnets are opposite to each other, a plurality of receiving spaces 3220 for receiving the flexible circuit board assembly 23 is formed between adjacent secondary magnets 322. The secondary pole plate 332 is a hollow annular structure, the secondary pole plate 332 is provided with a plurality of avoiding spaces 3320 arranged at the corners of the secondary pole plate 332 and respectively corresponding to the plurality of receiving spaces 3220, and a projection of each flexible circuit board along the vibration direction of the diaphragm 21 is at least partially located in the plurality of avoiding spaces 3320. The plurality of avoiding spaces 3320 of the secondary pole plate 332 provides a vibration space for the elastic connecting arm 2303 of each flexible circuit board.

In addition, the frame 1 includes a plurality of receiving grooves 10 for accommodating the first elastic fixing arms 2301 of the at least two flexible circuit boards. The plurality of receiving grooves 10 is recessed along the direction of the diaphragm 21, and each outer fixing portion 2301 is accommodated and fixed in a corresponding one of the receiving grooves 10.

Compared with the related art, in the speaker 100 of the present application, the first pad 2311 and the second pad 2312 are respectively located on two sides of the flexible circuit board 23, and the first lead wire 221 and the second lead wire 222 of the voice coil are respectively electrically connected with the first pad and the second pad, thereby avoiding the overturning of the voice coil lead, improving the consistency of the relative position of the voice coil 22 and the flexible circuit board 23, saving the space for the voice coil lead to turn over, and improving the acoustic performance of the product.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:

a frame, a vibration system fixed to the frame, comprising a diaphragm fixed to the frame, a voice coil with a lead wire, and a flexible circuit board assembly fixed to the frame and electrically connected with the voice coil, a magnetic circuit system for driving the vibration system to vibrate and emit sounds, fixed to the frame and comprising a magnetic gap, wherein the flexible circuit board assembly comprises at least two flexible circuit boards and a soldering sheet, the at least two flexible circuit boards comprise a first flexible circuit board, a second flexible circuit board, a third flexible circuit board, a fourth flexible circuit board, the first flexible circuit board, the second flexible circuit board, the third flexible circuit board, and the fourth flexible circuit board are spaced apart from each other and respectively arranged at four corners of the frame, each flexible circuit board comprises an outer fixing portion fixedly connected with the frame, an inner fixing portion spaced from the outer fixing portion, and an elastic connecting arm connecting the outer fixing portion and the inner fixing portion;

each inner fixing portion comprises an upper surface close to the diaphragm, the lead wire is arranged on a side of the first flexible circuit board close to the diaphragm, the upper surface of the first flexible circuit board is provided with a first pad, the upper surface of the second flexible circuit board is provided with a second pad, the lead wire is electrically connected to the first pad;

the soldering sheet electrically connects the voice coil and the second flexible circuit board and comprises a first fixing portion electrically connected to the second pad, a second fixing portion bent and extending from the first fixing portion to a direction away from the diaphragm, and a third fixing portion bent and extending from an end of the second fixing portion away from the first fixing portion to the voice coil, the third fixing portion is electrically connected to a bottom surface of the voice coil.

2. The speaker described as claim 1, wherein the first fixing portion of the soldering sheet and the second pad are fixedly connected by soldering.

3. The speaker described as claim 1, wherein the second fixing portion of the soldering sheet abuts against a side surface of the voice coil.

4. The speaker described as claim 1, wherein a width of the third fixing portion of the soldering sheet is the same as that of the bottom surface of the voice coil.

5. The speaker described as claim 1, wherein the magnetic circuit system comprises a yoke, and a main magnet and a plurality of secondary magnets located on the yoke, the plurality of secondary magnets is located around the main magnet and forms the magnetic gap with the main magnet, a plurality of receiving spaces for receiving the at least two flexible circuit boards are formed between adjacent secondary magnets of the plurality of secondary magnets.

6. The speaker described as claim 5, wherein the magnetic circuit system further comprises a main pole plate located on the main magnet and a secondary pole plate located on the plurality of secondary magnets, the secondary pole plate is provided with a plurality of avoiding spaces respectively corresponding to the plurality of receiving spaces, and a projection of the flexible circuit board assembly along the vibration direction of the diaphragm is at least partially located in a corresponding one of the avoiding spaces.

7. The speaker described as claim 1, wherein the frame comprises a plurality of receiving grooves for accommodating the outer fixing portions of the at least two flexible circuit boards, and each outer fixing portion is fixed in a corresponding one of the receiving grooves.

* * * * *